United States Patent
Huggahalli et al.

(10) Patent No.: US 7,231,470 B2
(45) Date of Patent: Jun. 12, 2007

(54) DYNAMICALLY SETTING ROUTING INFORMATION TO TRANSFER INPUT OUTPUT DATA DIRECTLY INTO PROCESSOR CACHES IN A MULTI PROCESSOR SYSTEM

(75) Inventors: Ram Huggahalli, Portland, OR (US); Raymond Tetrick, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 328 days.

(21) Appl. No.: 10/736,765

(22) Filed: Dec. 16, 2003

(65) Prior Publication Data

US 2005/0132102 A1   Jun. 16, 2005

(51) Int. Cl.
*G06F 3/00* (2006.01)
*G06F 13/28* (2006.01)
*G06F 13/00* (2006.01)

(52) U.S. Cl. .............................. 710/33; 710/1; 710/22; 711/100; 711/117; 711/118

(58) Field of Classification Search .................. 710/33, 710/35, 38, 107; 711/138
See application file for complete search history.

(56) References Cited

U.S. PATENT DOCUMENTS

| 6,574,682 | B1 * | 6/2003 | Chan ........................... 710/22 |
| 2004/0128450 | A1 * | 7/2004 | Edirisooriya et al. ....... 711/141 |
| 2004/0148473 | A1 * | 7/2004 | Hughes et al. .............. 711/144 |

* cited by examiner

*Primary Examiner*—Donald Sparks
*Assistant Examiner*—Richard B. Franklin, Jr.
(74) *Attorney, Agent, or Firm*—Buckley, Maschoff & Talwalkar LLC

(57) ABSTRACT

According to some embodiments, IO traffic is transferred directly into a target processor cache in accordance with routing information. For example, it may be determined at a requesting agent processor that IO traffic is to be received at the target processor cache, wherein the target processor is different than the requesting agent processor. Moreover, routing information associated with the IO traffic may be received from the requesting agent processor. It may then be arranged for the IO traffic to be transferred directly into the target processor cache in accordance with the routine information.

14 Claims, 7 Drawing Sheets

DYNAMICALLY SETTING ROUTING INFORMATION TO TRANSFER INPUT OUTPUT DATA DIRECTLY INTO PROCESSOR CACHES IN A MULTI PROCESSOR SYSTEM

BACKGROUND

An apparatus may process Input Output (IO) traffic using multiple processors. For example, a server might have two processors that process information packets received through a network. Moreover, it may be helpful to avoid unnecessary delays when processing IO traffic—especially when relatively high bandwidth traffic is being processed.

DETAILED DESCRIPTION

Figure 1:
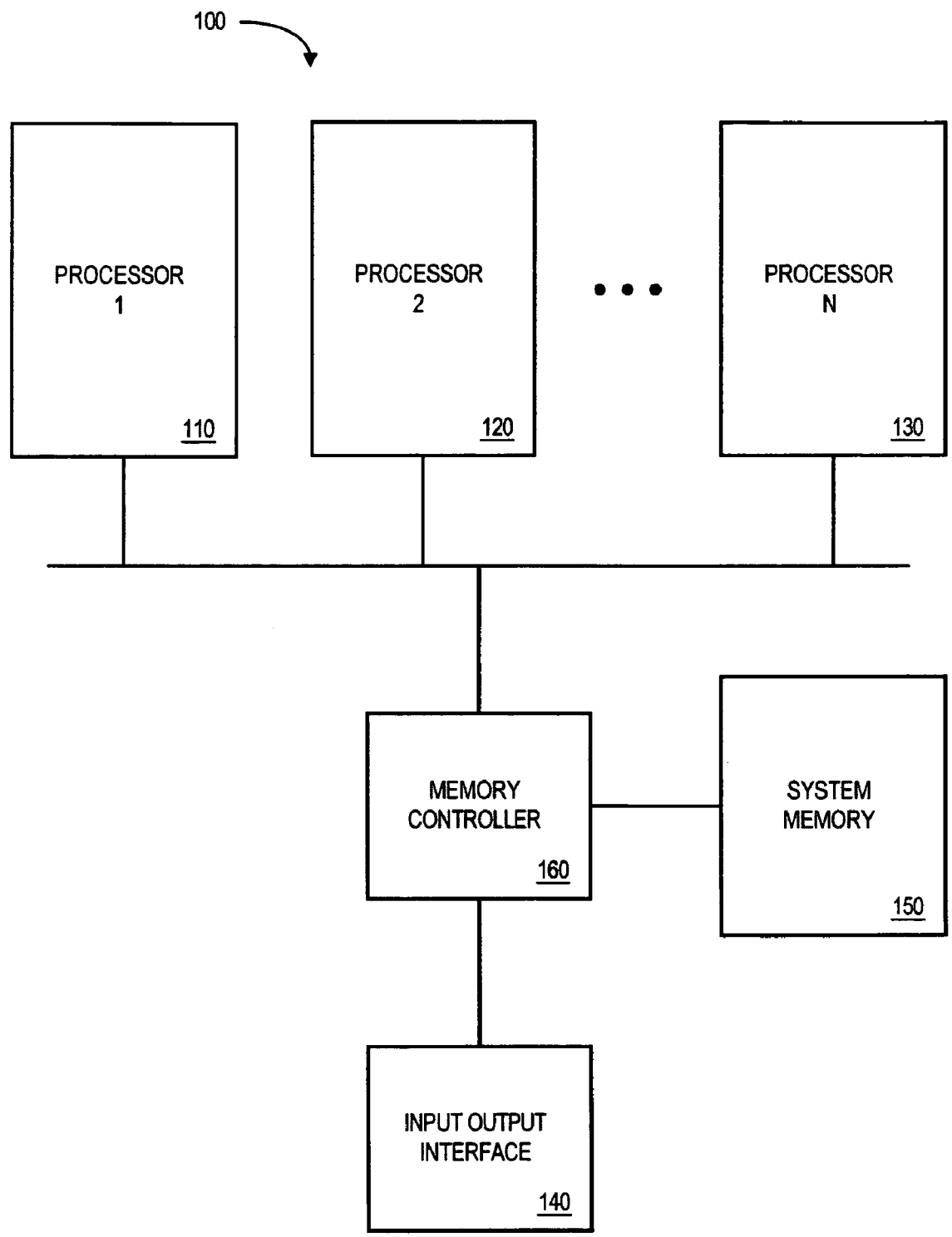
FIG. 1 is a block diagram of a multi-processor system.

An apparatus may process IO traffic using multiple processors. For example, FIG. 1 is a block diagram of a system 100 that has N processors 110, 120, 130 (e.g., INTEL® Pentium 4 processors).

The system 100 also includes an IO interface 140. The IO interface 140 may, for example, receive IO traffic from a network or a hard disk drive, by way of example only, the IO interface 140 might operate in accordance with the Peripheral Component Interconnect (PCI) Standards Industry Group (SIG) standard entitled "PCI Express 1.0" (2002).

When IO traffic is received, it may be stored in a system memory 150 via a memory controller 160. In particular, the memory controller 160 may be a Direct Memory Access (DMA) controller that transfers the IO traffic to the system memory 150. Note that in some cases, an IO device acts a DMA controller itself (e.g., the memory controller 160 just receives data from the IO device and sends it to system memory 150). The memory controller 160 may become a DMA controller if, for example, the IO device asks the memory controller 160 to move the data on its behalf.

The processors 110, 120, 130 can then access the data from the system memory 150 as needed to process the IO traffic. For example, an application executing at a processor may retrieve information packets from the system memory 150 and process the packets as appropriate.

Accessing information from the system memory 150, however, can be a relatively slow (e.g., high latency) process. To improve the performance of the system 100, according to some embodiments the IO traffic is stored directly into one or more cache memories at the processors (e.g., local memory that can be accessed by a processor more quickly as compared to the system memory 150).

When IO traffic is stored directly into cache memory, the new data could potentially interfere with other information that is already the cache (e.g., information associated with an application executing at the processor). Moreover, processes and/or threads may migrate between processors, making it difficult to determine which processor's cache should receive the IO traffic.

Figure 2:
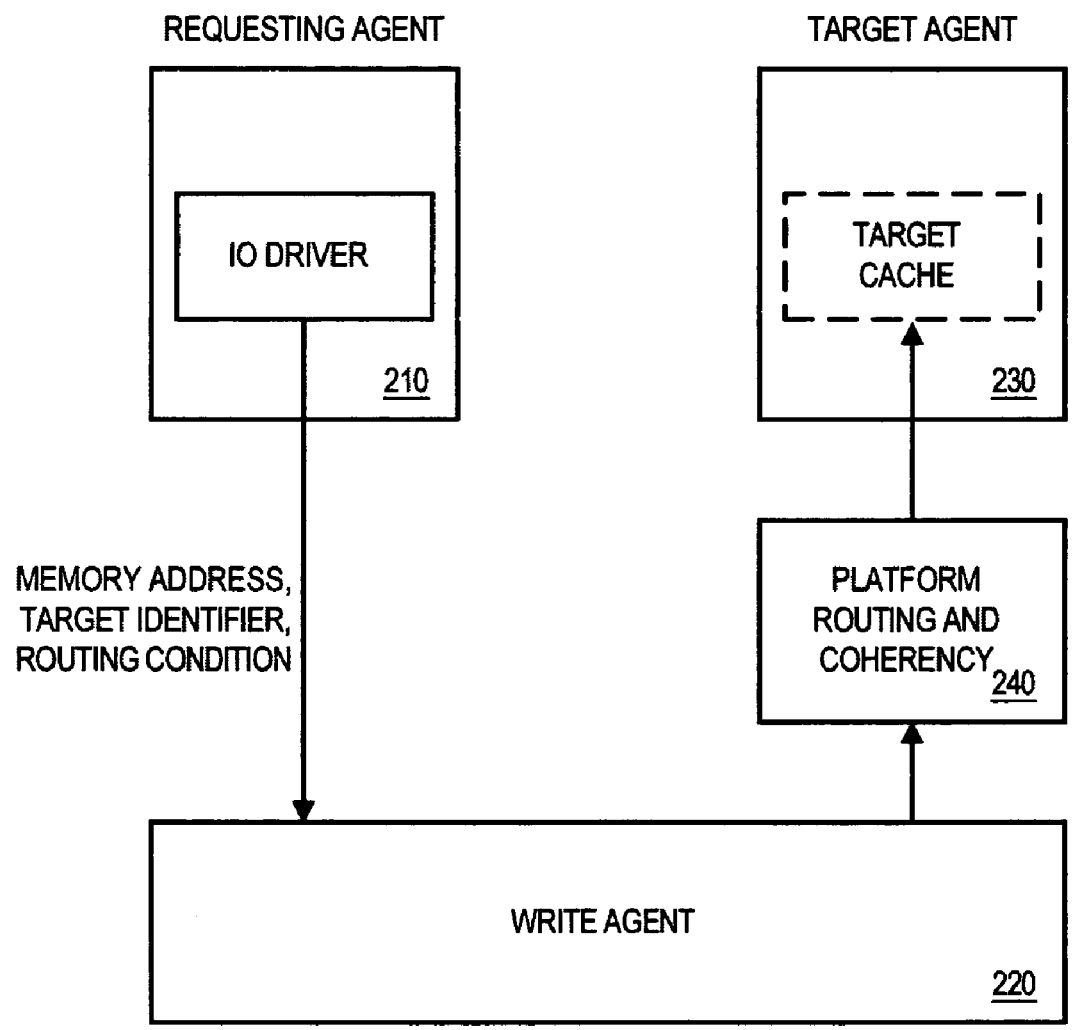
FIG. 2 is an information flow diagram according to some embodiments.

FIG. 2 is an information flow diagram according to some embodiments. In particular, one processor in a multi-processor system acts as a "requesting" agent 210 that arranges for IO traffic to be transferred directly into a cache of a "target" agent 230 (another processor). For example, the requesting agent 210 might provide routing information to a "write" agent 220 (e.g., an agent that is associated with an IO interface or DMA controller). The routing information might include, for example, a physical memory address and/or a target identifier (e.g., indicating that IO traffic should be stored at the cache of "processor 2").

The write agent 220 may then arrange for IO traffic to be transferred "directly" to the target cache in accordance with the routing information. That is, the IO traffic is not first stored into a system memory and then transferred from the system memory to the target cache. Note that the IO traffic might pass through platform routing and/or coherency functions 240 (e.g., handled by a chipset) before being stored in the target cache. Moreover, although the requesting agent 210 sets-up the transfer (e.g., by instructing the write agent 220 how the transfer should be performed), it does not need to be involved when the transfer is actually performed.

According to some embodiments, an IO driver executing at the requesting agent 210 establishes conditions and/or preferences associated with IO traffic. For example, the IO driver might determine that one type of IO traffic should be transferred directly to the cache of processor 1 while another type of IO traffic is transferred directly to the cache of processor 3.

Moreover, according to some embodiments the IO driver may indicate whether or not IO traffic should be placed in a target cache at all (e.g., the feature may be turned "off," in which case the IO traffic could simply be stored in a system memory). In addition, the IO driver might define how the information should be stored into a cache. For example, the IO driver might indicate that IO traffic should be "allocated" into the cache. That is, IO traffic should still be stored into the cache even when the cache is full (e.g., at the expense of other data in the cache). As another example, the IO driver might indicate that the target cache should be "updated" with IO traffic. That is, the write agent 220 might determine whether or not data is already in the cache (and if the data is already in the cache, it can be updated based on IO traffic). In some cases, the IO driver may identify a cache where data can be optionally placed to improve performance (e.g., depending on the state of the system when the IO traffic is received).

Although an IO driver 210 is illustrated in FIG. 2, other processes could arrange for IO traffic to be transferred directly to the target cache. For example, an Operating System (OS) and/or an application executing at the request agent 210 might provide routing information to the write agent 220.

The write agent 220 may be associated with an IO interface and/or a DMA controller. For example, the write agent 220 might receive a physical memory address and routing preferences (e.g., including a target identifier that indicates a particular processor in a multi-processor system) from the requesting agent 210. Moreover, information that should be transferred via DMA to memory (e.g., system memory or cache) can be pre-fixed with a physical address and a preferred target identifier. In addition, preferences may be encoded such that correct policies for cache coherency (e.g., so that other processors are aware of which cache is storing the IO traffic) and/or allocation are employed.

The target agent 230 may be, for example, a processor having a local cache (e.g., buffers that can accept data directly from the write agent 220). In some cases, the target agent 230 is a processor running an OS stack. For example, information packets may be processed in accordance with the Transmission Control Protocol/Internet Protocol (TCP/IP) as defined by Internet Engineering Task Force (IETF) Request For Comment (RFC) 791 entitled "Internet Protocol" (1981) and RFC 793 entitled "Transmission Control Protocol" (1981). Similarly, the target agent 230 may execute an application that consumes IO traffic.

Because the write agent 220 places IO traffic into the target cache (without first storing the information in system memory), unnecessary delays may be avoided when processing the IO traffic. Moreover, since the requesting agent 210 can control when and how this is performed, the approach is flexible and may be used in different types of general purpose multi-processor systems. Note that the requesting agent 210 might adaptively control IO interface-to-memory transactions (e.g., in terms of both whether data will be written to system memory or to cache and by controlling which processor should receive new IO traffic). In this way, the IO traffic may be routed to an appropriate processor (e.g., one that is executing an application that needs the data) in accordance with dynamic characteristics of applications and/or the state of the system.

Figure 3:
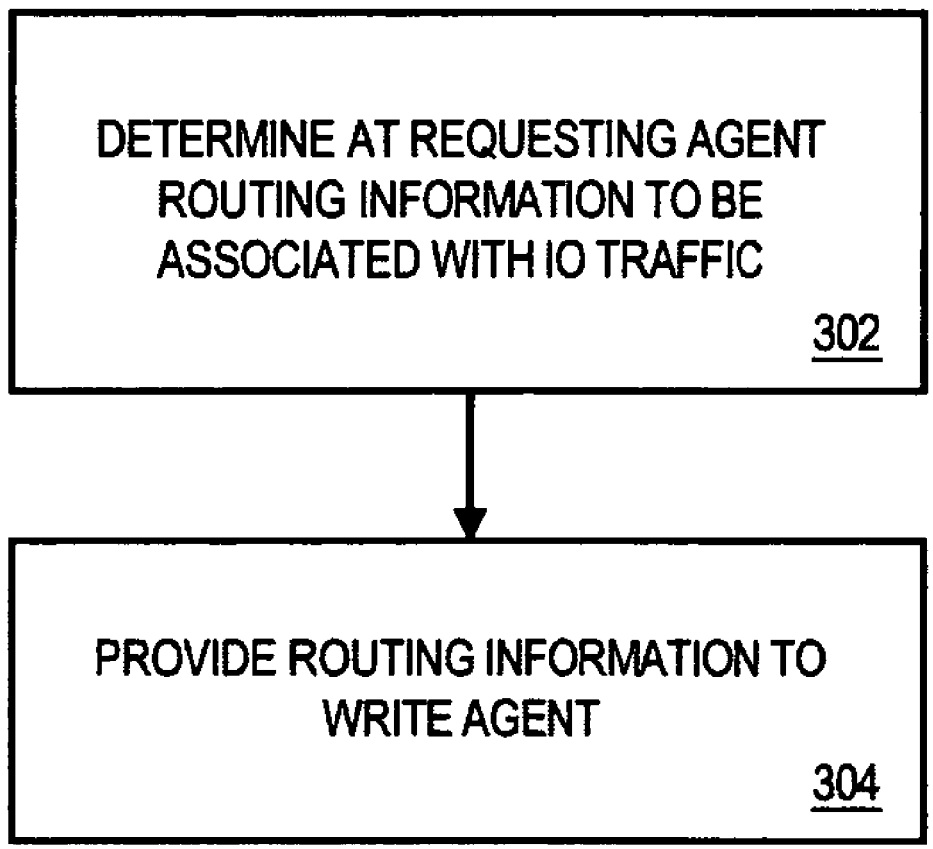
FIG. 3 is a method that may be performed by a requesting agent according to some embodiments.

FIG. 3 is a method that may be performed by a requesting agent according to some embodiments. The flow charts described herein do not necessarily imply a fixed order to the actions, and embodiments may be performed in any order that is practicable. Note that any of the methods described herein may be performed by hardware, software (including microcode), or a combination of hardware and software. For example, a storage medium may store thereon instructions that when executed by a machine result in performance according to any of the embodiments described herein.

At 302, a requesting agent determines routing information associated with IO traffic. For example, an IO driver executing at a first processor (which acts as the requesting agent) may determine that a particular type of IO traffic (e.g., from a hard disk drive) should be stored into the cache of another processor (e.g., which acts as a target agent). Note that the IO traffic might be associated with, for example, a network, a Network Interface Controller (NIC), a disk drive, and/or a PCI interface.

At 304, the requesting agent provides the routing information to a write agent that can arrange for the IO traffic to be transferred directly into a target processor cache in accordance with the routing information. For example, the IO driver might provide a physical memory address and/or a target processor identifier to the write agent.

Figure 4:
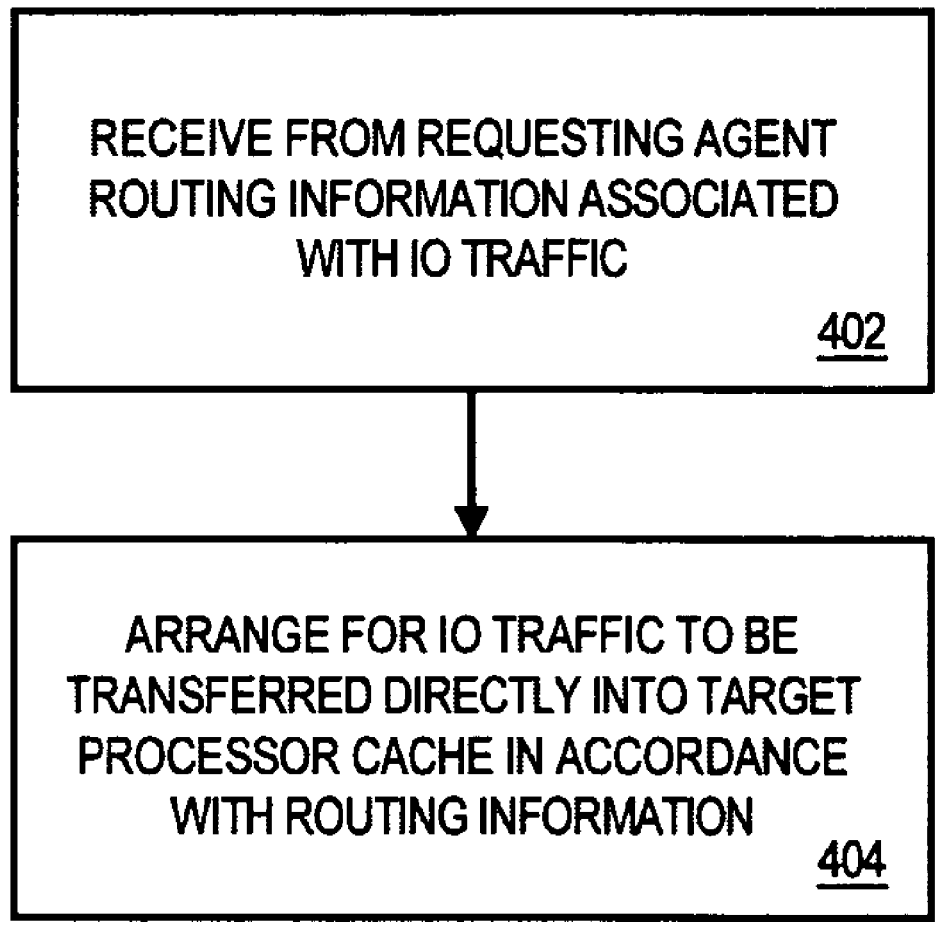
FIG. 4 is a method that may be performed by a write agent according to some embodiments.

FIG. 4 is a method that may be performed by the write agent according to some embodiments. At 402, the write agent receives from the requesting agent routing information associated with IO traffic. The routing information might include, for example, a memory address, a target processor identifier, a direct transfer on/off indication, a cache allocation/update indication, a routing policy, a routing condition, a routing preference, coherence information, and/or an allocation policy.

The write agent then arranges for the IO traffic to be transferred directly into a target processor cache in accordance with the routing information at 404. For example, the write agent might store certain types of IO traffic in a system memory and other types of IO traffic in one or more caches.

Figure 5:
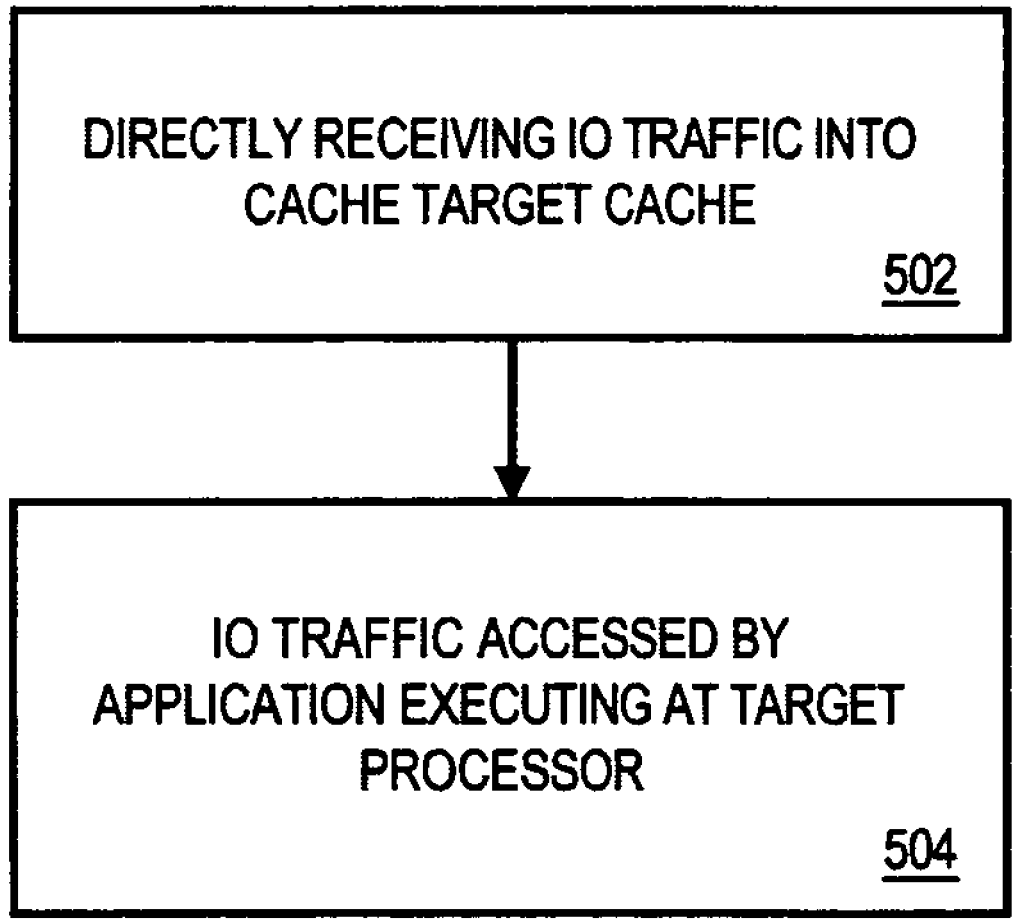
FIG. 5 is a method that may be performed by a target agent according to some embodiments.

FIG. 5 is a method that may be performed by a target agent according to some embodiments. At 502, the target agent receives IO traffic directly into a target cache. At 504, the IO traffic is accessed by an application (or OS stack) executing at the target processor. Because the IO traffic does not need to be retrieved from an external system memory, the performance of the system may be improved.

Figure 6:
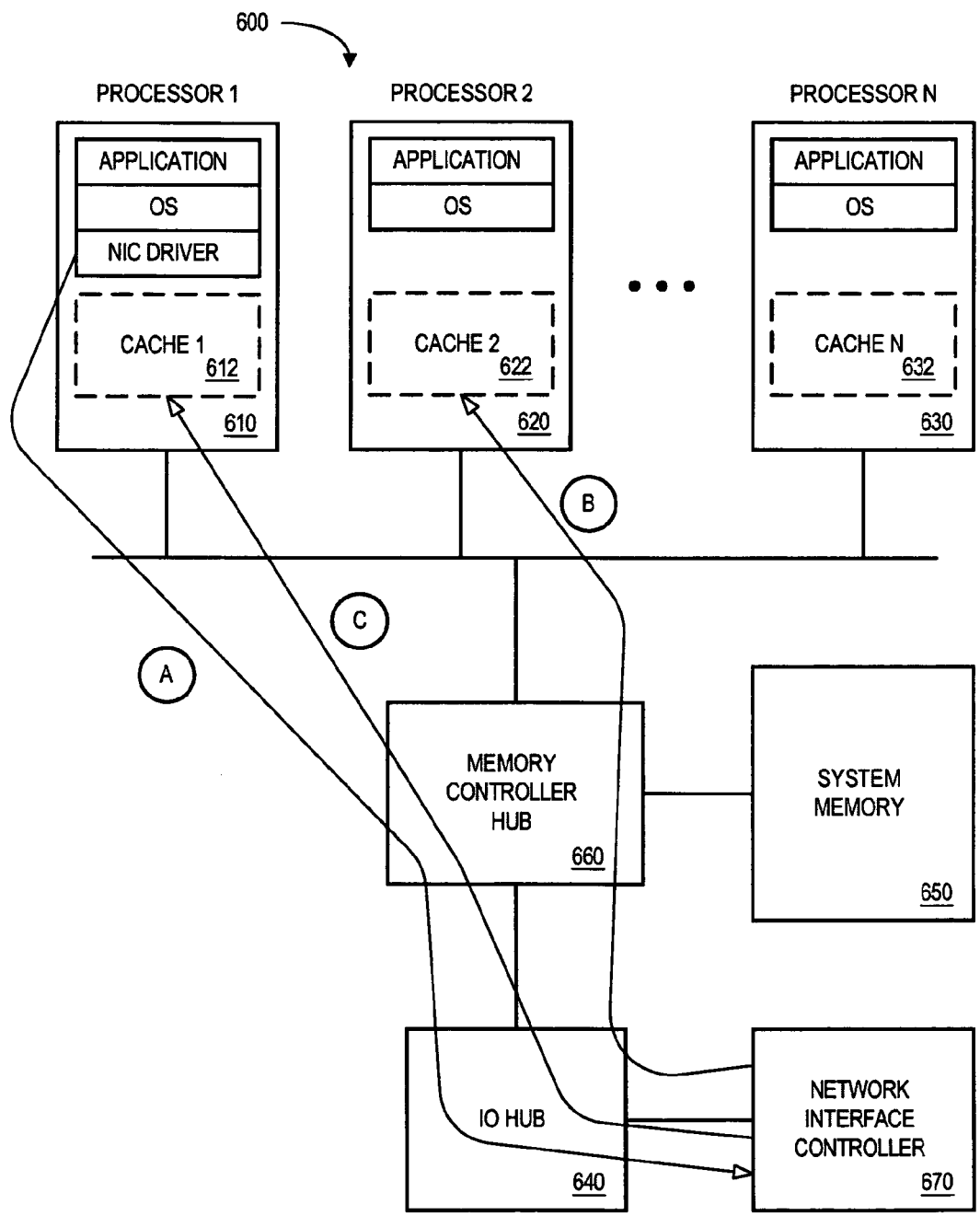
FIG. 6 is an example of a multi-processor system according to some embodiments.

FIG. 6 is an example of a system 600 that has N processors 610, 620, 630 and each processor has a local cache 612, 622, 632. The system 600 might be, for example, a server that receives information packets from a network, such as a Local Area Network (LAN), a Wide Area Network (WAN), or an Internet Protocol (IP) network.

The system 600 also includes an IO hub 640 that receives IO traffic from a NIC 670. The IO might then be stored in a system memory 650 via a memory controller hub 660, such as a multiprocessor hub associated with the Intel® 870 chipset. Note that in some cases, the NIC 670 may instead be coupled directly to the memory controller hub 660.

As illustrated by arrow A in FIG. 6, a NIC driver executing at the first processor 610 may provide routing information to the NIC 670. In this example, the NIC driver indicates that: (i) IO packets received by the system 600 should be stored in the cache 622 of the second processor 620 (e.g., to be consumed by an application executing at the second processor 620), and (ii) the status of each packet when it arrives should be stored in the cache 612 of the first processor 610. Note that in this example, there are two target agents (the first and second processors 610, 620). In addition, the first processor 610 serves as both a requesting agent and a target agent.

The NIC 670 then arranges for received information packets to be stored directly in the cache 622 of the second processor 620 via arrow B (e.g., using a DMA transaction that is executed by the memory controller hub 660). An application executing at the second processor 620 can retrieve the information packets from the local cache 622 and process the packets as appropriate. Similarly, the NIC 670 arranges for the status of each packet to be stored in the cache 612 of the first processor 610 via arrow C. The driver program running on the processor 610 may then check the status of the packet and respond to the status (whatever it might be).

Figure 7:
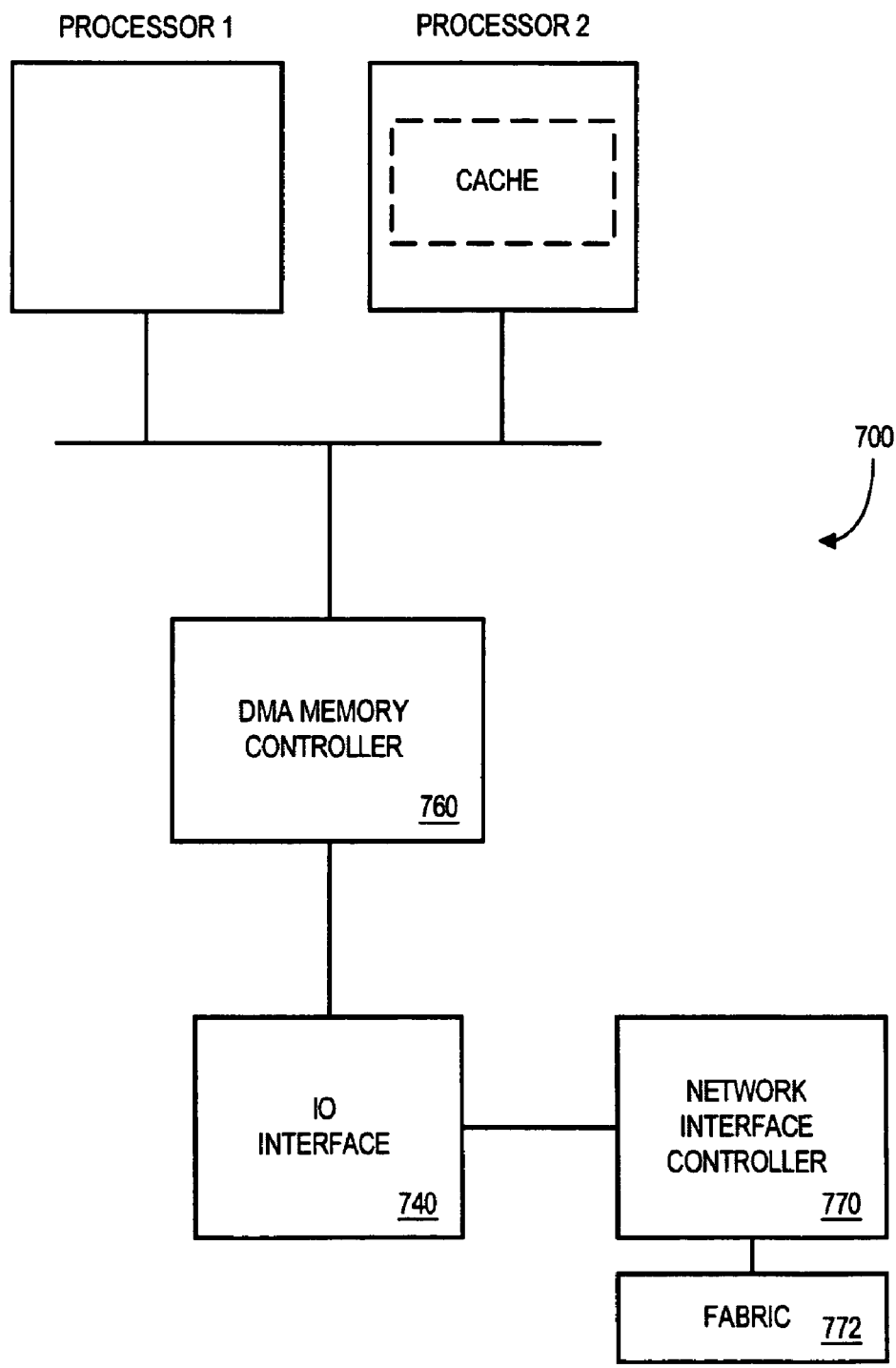
FIG. 7 illustrates a dual processor system according to one embodiment.

FIG. 7 illustrates a dual processor system 700 according to one embodiment, with at least one processor having a local cache. An IO interface 740 arranges for information from a network fabric 772 via a network interface controller 770 to be provided to the cache via a DMA memory controller 760 in accordance with any of the embodiments described herein. For example, routing information may be dynamically set to transfer IO data directly into processor caches in a multi processor system.

The following illustrates various additional embodiments. These do not constitute a definition of all possible embodiments, and those skilled in the art will understand that many other embodiments are possible. Further, although the following embodiments are briefly described for clarity, those skilled in the art will understand how to make any changes, if necessary, to the above description to accommodate these and other embodiments and applications.

For example, although some embodiments have been described with respect to certain IO protocols, embodiments may use other protocols, such as a protocol in which there are IO writes to memory and where processors need to access the data. By way of example, embodiments may be associated with a Universal Serial Bus (USB) interface as described in the USB Specification Revision 2.0 (2000) or a 1394 interface as described in the Institute of Electrical and Electronics Engineers (IEEE) document 1394a (2000). Moreover, the data may come from any type of device, such as a network fabric, a disk drive, a graphics device, or a peripheral device connected via a USB or 1394 interface.

Moreover, although some embodiments have been described with respect to multi-processor systems, embodiments may be associated with a single processor system. In this case, the processor may act as a requesting agent and a target agent (e.g., having a target cache). For example, the processor might provide to a write agent routing information that includes routing preferences that indicate when IO traffic should be transferred directly to the target cache and when it should instead be stored in system memory.

The several embodiments described herein are solely for the purpose of illustration. Persons skilled in the art will recognize from this description other embodiments may be practiced with modifications and alterations limited only by the claims.

What is claimed is:

1. A method, comprising:
    determining at a requesting agent processor that Input Output (IO) traffic is to be received at a target processor cache of a target processor, wherein the target processor is different than the requesting agent processor;
    receiving at a write agent, from the requesting agent processor, routing information associated with the IO traffic;
    arranging by the write agent for information packets of the IO traffic to be transferred directly into the target processor cache in accordance with the routing information; wherein the write agent is different than the requesting agent processor and the target processor and comprises at least one of: (i) a direct memory access controller, or (ii) a IO controller hub; and
    transferring, by the write agent, status information associated with the IO traffic directly into a requesting agent cache of the requesting agent processor.

2. The method of claim 1, wherein the routing information is received from an IO driver executing at the requesting agent processor.

3. The method of claim 1, wherein the routing information includes at least one of: (i) a memory address, (ii) a target processor identifier, (iii) a direct transfer on/off indication, (iv) a cache allocation/update indication, (v) a routing policy, (vi) a routing condition, (vii) a routing preference, (viii) coherence information, or (ix) an allocation policy.

4. The method of claim 1, wherein the IO traffic is associated with at least one of: (i) a network, (ii) a network interface controller, (iii) a disk drive controller, (iv) a peripheral component interconnect interface, (v) a universal serial bus interface, or (vi) a 1394 interface.

5. The method of claim 1, wherein the arranging is performed in a multi-processor system that includes a plurality of potential target processor caches.

6. The method of claim 1, further comprising:
    receiving the IO traffic; and
    determining whether the IO traffic should be stored in system memory or be transferred directly into the target processor cache.

7. The method of claim 1, wherein the routing information indicates that one type of IO traffic should be transferred directly into the target processor cache while another type of IO traffic should be transferred directly into another target processor cache.

8. The method of claim 1, wherein the IO traffic is received from at least one of: (i) a network fabric, and (ii) a disk drive, a (iii) a graphics device, or (iv) a peripheral device.

9. The method of claim 1, wherein the IO traffic is transferred into the target processor cache in accordance with a chipset's platform routing function.

10. An article, comprising:
    a first computer-readable storage medium having stored thereon instructions that when executed by a machine result in the following:
    determining at a requesting agent processor that Input Output (IO) traffic is to be received at a target processor cache of a target processor, wherein the target processor is different than the requesting agent processor;
    a second computer-readable storage medium having stored thereon instructions that when executed by a machine result in the following:
    receiving from the requesting agent processor routing information associated with the IO traffic;
    arranging by a write agent for information packets of the IO traffic to be transferred directly into the target processor cache in accordance with the routing information, wherein the write agent is different than the requesting agent processor and the target processor and comprises an IO controller hub; and
    transferring, by the write agent, status information associated with the IO traffic directly into a requesting agent cache of the requesting agent processor.

11. The article of claim 10, wherein, wherein the routing information is received from an IO driver executing at the requesting agent processor.

12. The article of claim 10, wherein the routing information includes at least one of: (i) a memory address, (ii) a target processor identifier, (iii) a direct transfer on/off indication, (iv) a cache allocation/update indication, (v) a routing policy, (vi) a routing condition, (vii) a routing preference, (viii) coherence information, or (ix) an allocation policy.

13. A system, comprising:
    a network interface controller coupled to a network fabric;
    a requesting agent processor having a requesting agent cache;
    a target processor having a target processor cache, wherein the target processor is different than the requesting agent processor; and
    a write agent comprising a direct memory access controller, including:
        an input path to receive from the requesting agent processor routing information associated with IO traffic; and
    a processing element to (i) arrange for information packets of the IO traffic to be transferred directly into the target processor cache in accordance with the routing information, and (ii) arrange for status information associated with the IO traffic to be transferred directly into the requesting agent cache.

14. The system of claim 13, wherein an IO driver executing at the requesting agent processor provides the routing information to the write agent.

* * * * *